United States Patent
Murayama et al.

(10) Patent No.: US 12,024,464 B2
(45) Date of Patent: Jul. 2, 2024

(54) GLASS FOR CHEMICAL STRENGTHENING

(71) Applicant: AGC Inc., Tokyo (JP)

(72) Inventors: Suguru Murayama, Tokyo (JP); Akio Koike, Tokyo (JP)

(73) Assignee: AGC Inc., Tokyo (JP)

(*) Notice: Subject to any disclaimer, the term of this patent is extended or adjusted under 35 U.S.C. 154(b) by 904 days.

(21) Appl. No.: 17/034,172

(22) Filed: Sep. 28, 2020

(65) Prior Publication Data
US 2021/0009462 A1 Jan. 14, 2021

Related U.S. Application Data

(63) Continuation of application No. PCT/JP2019/014386, filed on Mar. 29, 2019.

(30) Foreign Application Priority Data

Apr. 4, 2018 (JP) ................. 2018-072487

(51) Int. Cl.
*C03C 3/091* (2006.01)
*C03C 3/085* (2006.01)
*C03C 3/087* (2006.01)
*C03C 3/093* (2006.01)
*C03C 21/00* (2006.01)

(52) U.S. Cl.
CPC .......... *C03C 3/091* (2013.01); *C03C 3/085* (2013.01); *C03C 3/087* (2013.01); *C03C 3/093* (2013.01); *C03C 21/002* (2013.01)

(58) Field of Classification Search
CPC ......... C03C 3/087; C03C 3/085; C03C 3/091; C03C 3/093; C03C 21/002
See application file for complete search history.

(56) References Cited

U.S. PATENT DOCUMENTS

| | | | |
|---|---|---|---|
| 2011/0312483 A1* | 12/2011 | Nakashima | C03C 3/083 65/30.14 |
| 2012/0321898 A1 | 12/2012 | Meinhardt et al. | |
| 2015/0259244 A1 | 9/2015 | Amin et al. | |
| 2016/0347655 A1 | 12/2016 | Meinhardt et al. | |
| 2017/0174556 A1 | 6/2017 | Miyabe et al. | |
| 2018/0186685 A1 | 7/2018 | Murayama et al. | |
| 2018/0265397 A1 | 9/2018 | Murayama et al. | |
| 2018/0319706 A1 | 11/2018 | Murayama et al. | |
| 2018/0327304 A1 | 11/2018 | Murayama et al. | |
| 2019/0194057 A1 | 6/2019 | Murayama et al. | |
| 2019/0263713 A1 | 8/2019 | Murayama et al. | |
| 2019/0276355 A1 | 9/2019 | Meinhardt et al. | |
| 2019/0292099 A1 | 9/2019 | Murayama et al. | |
| 2020/0109083 A1 | 4/2020 | Imakita et al. | |

FOREIGN PATENT DOCUMENTS

| | | | |
|---|---|---|---|
| CN | 101439930 A | 5/2009 | |
| CN | 101448753 A | 6/2009 | |
| CN | 105452182 A | 3/2016 | |
| JP | 2012-020921 A | 2/2012 | |
| JP | 2013-520388 A | 6/2013 | |
| WO | WO 2015/162845 A1 | 10/2015 | |
| WO | WO-2015162845 A1 * | 10/2015 | ............ C03C 21/00 |
| WO | WO 2017/126607 A1 | 7/2017 | |
| WO | WO 2019/004124 A1 | 1/2019 | |

OTHER PUBLICATIONS

International Search Report issued Jul. 2, 2019 in PCT/JP2019/014386 filed on Mar. 29, 2019, 2 pages.

* cited by examiner

*Primary Examiner* — Elizabeth A. Bolden

(74) *Attorney, Agent, or Firm* — Oblon, McClelland, Maier & Neustadt, L.L.P.

(57) ABSTRACT

The purpose of the present invention is to provide a glass for chemical strengthening that exhibits a high strength after chemical strengthening and is resistant to devitrification. The present invention relates to a glass for chemical strengthening that contains, expressed as mol % on an oxide basis, 55 to 70% $SiO_2$, 10 to 25% $Al_2O_3$, 1 to 20% $Li_2O$, 0 to 8% CaO, 0 to 8% SrO, and 0 to 5% $ZrO_2$, in which the sum of the contents of CaO and SrO is 1.5 to 10%, the sum of the contents of $Na_2O$ and $K_2O$ is 3 to 11%, and the value X given by the formula $([Li_2O]+[K_2O])/[Al_2O_3]$ is 0.1 to 1.1.

9 Claims, 2 Drawing Sheets

GLASS FOR CHEMICAL STRENGTHENING

TECHNICAL FIELD

The present invention relates to a glass for chemical strengthening.

BACKGROUND ART

Nowadays, cover glasses constituted of a chemically strengthened glass are used for both protecting the display devices of mobile appliances, such as cell phones, smartphones, personal digital assistants (PDA), and tablet terminals, and heightening the appearance attractiveness thereof.

In chemically strengthened glasses, there is a tendency that the larger the surface compressive stress (value) (CS) or depth of compressive-stress layer (DOC), the higher the strength. Meanwhile, internal tensile stress (CT) for balancing with the surface compressive stress is generated inside the glass, and hence the larger the CS or DOC, the larger the CT. In cases when a glass having a large CT breaks, the number of fragments is large and the fragments are easily scattered.

Patent Document 1 describes a feature that an increase in surface compressive stress can be attained while inhibiting the internal tensile stress from increasing, by performing a two-stage chemical strengthening treatment to thereby form a stress profile represented by a bent line. Specifically, the patent document proposes a method in which a $KNO_3$/$NaNO_3$ salt mixture having a relatively low potassium salt concentration is used in first-stage chemical strengthening and a $KNO_3$/$NaNO_3$ salt mixture having a relatively high potassium salt concentration is used in second-stage chemical strengthening.

Patent Document 2 discloses a lithium aluminosilicate glass in which a relatively large surface compressive stress and a relatively large depth of compressive-stress layer are obtained by a two-stage chemical strengthening treatment. The lithium aluminosilicate glass can be increased in both CS and DOC by a two-stage chemical strengthening treatment in which a sodium salt is used in a first-stage chemical strengthening treatment and a potassium salt is used in a second-stage chemical strengthening treatment.

CITATION LIST

Patent Literature

Patent Document 1: U.S. Patent Application Publication No. 2015/259244

Patent Document 2: JP-T-2013-520388 (The term "JP-T" as used herein means a published Japanese translation of a PCT patent application.)

SUMMARY OF INVENTION

Technical Problem

There is a growing demand nowadays for a cover glass which is thinner and more lightweight or a cover glass which has been processed into, for example, a curved shape, and lithium aluminosilicate glasses are attracting attention as glasses capable of being increased in both surface compressive stress value (CS) and depth of compressive-stress layer (DOC).

However, lithium aluminosilicate glasses tend to be devitrified during glass production steps or in steps in which the glasses obtained are subjected to bending, etc.

An object of the present invention is to provide a glass for chemical strengthening, the glass being less apt to be devitrified and being capable of attaining a large CS and a large DOC.

Solution to Problem

The present invention provides a glass for chemical strengthening including, in terms of mole percentage on an oxide basis:
55-70% of $SiO_2$;
10-25% of $Al_2O_3$;
1-20% of $Li_2O$;
0-8% of $CaO$;
0-8% of $SrO$; and
0-5% of $ZrO_2$, and
having a total content of CaO and SrO of 1.5-10%,
a total content of $Na_2O$ and $K_2O$ of 3-11%, and
a value of X represented by the following expression of 0.1-1.1:

$X=([Li_2O]\pm[K_2O])/[Al_2O_3]$, in which $[Al_2O_3]$, $[Li_2O]$, and $[K_2O]$ designate contents of the respective components in mole percentage.

The glass for chemical strengthening preferably has a total content of MgO, BaO, and ZnO of 0-5%. The glass for chemical strengthening preferably has a content of $B_2O_3$ of 0-10%.

The glass for chemical strengthening preferably has a temperature (T4) at which a viscosity of the glass is $10^4$ dPa·s of 1,050-1,300° C.

The glass for chemical strengthening preferably has a devitrification temperature which is not higher than a temperature (T4+120° C.) that is higher by 120° C. than the temperature (T4) at which the viscosity of the glass is $10^4$ dPa·s.

The glass for chemical strengthening preferably has a devitrification temperature which is not lower than a temperature (T5.5) at which the viscosity of the glass is $10^{5.5}$ dPa·s.

The glass for chemical strengthening preferably has a temperature (T2) at which the viscosity of the glass is $10^2$ dPa·s of 1,400-1,800° C.

The glass for chemical strengthening preferably has a surface compressive stress (CS2, which will be described later) of 950 MPa or larger and a depth of a surface compressive-stress layer (DOC3, which will be described later) of 100 μm or larger, after being subjected, as a glass sheet having a thickness of 0.8 mm, to two-stage chemical strengthening including 3-hour immersion in 450° C. sodium nitrate and subsequent 1.5-hour immersion in 450° C. potassium nitrate.

Avantageous Effects of the Invention

The present invention can provide a chemically strengthened glass which is less apt to be devitrified and has a large value of surface compressive stress (CS) and a large depth of compressive-stress layer (DOC).

DESCRIPTION OF EMBODIMENTS

Figure 1:
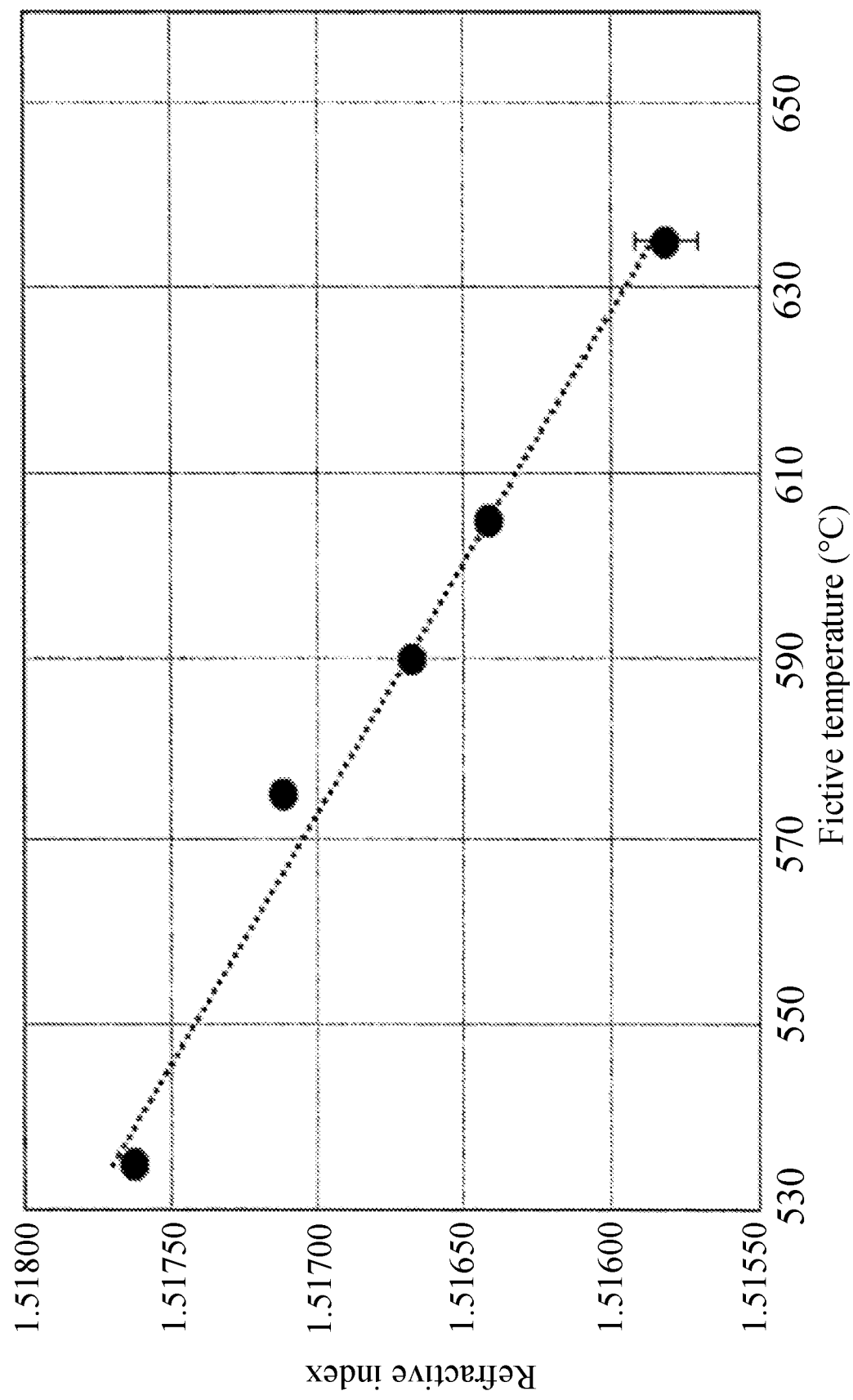
FIG. 1 is an example of graph showing a relationship between fictive temperature and refractive index.

The glass for chemical strengthening of the present invention is explained below in detail, but the invention is not limited to the following embodiments and can be modified at will within the scope of the invention.

In this description, the term "chemically strengthened glass" means a glass after being subjected to a chemical strengthening treatment. The term "glass for chemical strengthening" means a glass before being subjected to a chemical strengthening treatment.

In this description, the glass composition of a glass for chemical strengthening is often referred to as the base composition of a chemically strengthened glass. A chemically strengthened glass usually has a compressive-stress layer formed in a surface portion of the glass by ion exchange and the glass composition of the portion which has not undergone the ion exchange is identical with the base composition of the chemically strengthened glass.

In this description, glass compositions are expressed in terms of mole percentage on an oxide basis and "% by mole" is often abbreviated to %. A symbol "-" indicating a numerical range is used in the sense of including the numerical values set forth before and after the "-" as a lower limit value and an upper limit value respectively.

The expression "substantially not contained" used for a glass composition means that the glass composition does not contain a component other than that which has come thereinto as unavoidable impurities contained in raw materials, etc. Namely, the expression means that the component has not been purposely incorporated. Specifically, in the case of coloring ingredients such as transition-metal oxides, the content thereof in the glass composition is less than 0.01% by mole. In the case of any oxide other than the coloring ingredients, the content thereof in the glass composition is less than 0.1% by mole.

In this description, "stress profile" is a pattern showing compressive stress values using the depth from the glass surface as a variable. Negative values of compressive stress mean tensile stress.

Hereinafter, unless otherwise indicated, the phrase "surface compressive stress value" of a glass is a value of surface compressive stress determined by examining a chemically strengthened glass sheet obtained by subjecting a glass sheet to a chemical strengthening treatment, the glass sheet having been obtained by holding a 0.8-mm-thick sheet of the glass for 1 hour or longer at a temperature higher than the glass transition point Tg by 50° C. and then annealing the glass sheet at a cooling rate of 0.5° C./min. There is a tendency that the lower the fictive temperature of the glass, the larger the surface compressive stress caused by the chemical strengthening treatment. The fictive temperature of the glass is affected by the heat history (e.g., cooling rate) of the glass. Hence, the influence of fictive temperature is eliminated in evaluating the glass, by regulating a heat treatment and gradual cooling.

The "β-OH value" of a glass sheet is determined from a transmittance $X_1$ (%) measured at a wavenumber of 4,000 cm$^{-1}$ by the FT-IR method, a minimum transmittance $X_2$ (%) measured by the method at around 3,570 cm$^{-1}$, which is an absorption wavenumber for the hydroxyl group, and the thickness t (unit: mm) of the glass sheet using Expression (1).

$$\beta\text{-OH value} = (1t/\log_{10}(X_1/X_2)) \quad (1)$$

The β-OH value can be regulated by regulating the water content of each raw material for the glass and melting conditions.

Glass for Chemical Strengthening

It is preferable that the glass for chemical strengthening of the present invention (hereinafter often referred to as "the present glass") includes, in terms of mole percentage on an oxide basis, 55-70% of $SiO_2$,
10-25% of $Al_2O_3$,
1-20% of $Li_2O$,
0-8% of CaO,
0-8% of SrO, and
0-5% of $ZrO_2$, and
has a total content of CaO and SrO of 1.5-10% and a total content of $Na_2O$ and $K_2O$ of 3-11%.

It is preferable that the present glass has a value of X represented by the following expression of 0.1-1.1:

$$X = ([Li_2O] \pm [K_2O])/[Al_2O_3]$$

where [$Al_2O_3$], [$Li_2O$], and [$K_2O$] are the contents of the respective components in mole percentage.

The present inventors made investigations on relationships of the glass compositions of glasses for chemical strengthening with compressive stress values after chemical strengthening and with chemical strengthening properties, and have discovered a glass composition which makes it possible to introduce a large value of compressive stress through a chemical strengthening treatment and which is less apt to be devitrified.

Preferred glass compositions are explained below.

$SiO_2$ is a component which constitutes a glass network and enhances the chemical durability. From the standpoint of making the glass less apt to crack when having received surface scratches, the content of $SiO_2$ is preferably 55% or higher, more preferably 58% or higher, still more preferably 61% or higher, especially preferably 64% or higher. Meanwhile, from the standpoint of satisfactory meltability, the content of $SiO_2$ is 70% or less, preferably 68% or less, more preferably 66% or less.

The content of $Al_2O_3$ is preferably 10% or higher, more preferably 12% or higher, still more preferably 14% or higher, from the standpoints of improving ion exchange property in chemical strengthening and of obtaining an increased surface compressive stress through the strengthening. Meanwhile, from the standpoint of inhibiting devitrification, the content of $Al_2O_3$ is preferably 25% or less, more preferably 20% or less, still more preferably 18% or less, especially preferably 16% or less.

$Li_2O$ is a component which produces surface compressive stress through ion exchange and which improves the meltability of the glass. Since the glass for chemical strengthening contains $Li_2O$, a stress profile having both a large surface compressive stress and a large depth of compressive-stress layer is obtained by a method in which Li ions in the glass surface are replaced by Na ions by ion exchange and Na ions are replaced by K ions by ion exchange. From the standpoint of easily obtaining a preferred stress profile, the content of $Li_2O$ is 1% or higher, preferably 4% or higher, more preferably 7% or higher, especially preferably 9% or higher.

Meanwhile, too high $Li_2O$ contents result in too high a devitrification growth rate during glass melting to pose a serious problem concerning a decrease in yield due to devitrification. Consequently, the content of $Li_2O$ is 20% or less, preferably 18% or less, more preferably 15% or less, still more preferably 13% or less.

Na$_2$O and K$_2$O, although not essential, are each a component which improves the meltability of the glass and lowers the devitrification growth rate of the glass. Na$_2$O and K$_2$O may be added in order to improve the ion exchange property.

The total content of Na$_2$O and K$_2$O ([Na$_2$O]+[K$_2$O]) is preferably 0-11%, more preferably 3% or higher, still more preferably 5% or higher. Meanwhile, the total content thereof is more preferably 8% or less, especially preferably 7% or less.

The content ratio represented by [Li$_2$O]/([Na$_2$O]+[K$_2$O]) is preferably 3 or less, more preferably 2.5 or less, still more preferably 2 or less, from the standpoint of lowering the devitrification growth rate. Meanwhile, from the standpoint of obtaining an increased surface compressive stress by a chemical strengthening treatment with sodium, [Li$_2$O]/([Na$_2$O]±[K$_2$O]) is preferably 0.5 or larger, more preferably 0.9 or larger, still more preferably 1.3 or larger.

The content ratio represented by ([Li$_2$O]±[K$_2$O])/[Al$_2$O$_3$] is preferably 1.1 or less, more preferably 1.0 or less, still more preferably 0.8 or less, from the standpoint of obtaining an increased surface compressive stress by a chemical strengthening treatment. Meanwhile, from the standpoints of lowering the melting temperature of the glass and inhibiting devitrification, ([Li$_2$O]±[K$_2$O])/[Al$_2$O$_3$] is preferably 0.1 or larger, more preferably 0.3 or larger, still more preferably 0.5 or larger.

Na$_2$O is a component which forms a surface compressive-stress layer in a chemical strengthening treatment with a potassium salt and which improves the meltability of the glass.

From the standpoint of obtaining the effects thereof, the content of Na$_2$O is preferably 1% or higher, more preferably 2% or higher, still more preferably 3% or higher, especially preferably 4% or higher. Meanwhile, from the standpoint of avoiding a decrease in the surface compressive stress obtained by a chemical strengthening treatment with a sodium salt, the content of Na$_2$O is preferably 10% or less, more preferably 8% or less, still more preferably 6% or less, especially preferably 5% or less.

K$_2$O may be incorporated in order to, for example, improve the ion exchange property. The content of K$_2$O, in cases when it is contained, is preferably 0.5% or higher, more preferably 1% or higher, still more preferably 1.5% or higher, especially preferably 2% or higher, typically 3% or higher. Meanwhile, from the standpoint of avoiding a trouble that the surface compressive stress (CS) is reduced by a potassium salt, the content of K$_2$O is preferably 10% or less, more preferably 5% or less, still more preferably 3% or less, especially preferably 2% or less.

MgO, CaO, SrO, BaO, and ZnO (hereinafter often referred inclusively to as "alkaline-earth oxides, etc.") are each not essential. It is, however, preferable that the glass for chemical strengthening contains one or more of the alkaline-earth oxides, etc., from the standpoint of enhancing the stability of the glass.

The present glass is a lithium aluminosilicate glass which comes to have a high surface compressive stress through an ion-exchange treatment, and contains SiO$_2$, Al$_2$O$_3$, and Li$_2$O in relatively high concentrations. As a result, lithium aluminosilicate crystals are prone to precipitate during glass sheet production or during glass sheet forming with heating. Lithium aluminosilicate crystals grow at a high rate in a short time period and are hence prone to lower the quality of products such as glass sheets. The alkaline-earth oxides, etc. contained in the glass composition have the effect of inhibiting lithium aluminosilicate crystals from precipitating or growing. The total content of the alkaline-earth oxides, etc. ([MgO]+[CaO]+[SrO]+[BaO]+[ZnO]) is preferably 1% or higher, more preferably 2% or higher, still more preferably 3% or higher, especially preferably 4% or higher. Meanwhile, from the standpoint of improving the ion exchange property by chemical strengthening, the total content thereof is preferably 20% or less, more preferably 15% or less, still more preferably 10% or less, yet still more preferably 8% or less.

From the standpoint of inhibiting the precipitation of lithium aluminosilicate crystals, it is more preferable that the present glass contains one or more oxides selected form MgO, CaO, SrO, and BaO.

In the case where the present glass contains MgO and one or more of CaO, SrO, BaO, and ZnO, the content ratio represented by [MgO]/([CaO]+[SrO]+[BaO]+[ZnO]) is preferably 10 or larger, more preferably 15 or larger, still more preferably 20 or larger, especially preferably 25 or larger, from the standpoint of reducing the surface reflectance of the glass. Since CaO, SrO, BaO, and ZnO are more effective in heightening the refractive index than MgO, the refractive index can be lowered by heightening the relative content of MgO. The lowered refractive index reduces the surface reflectance of the glass.

From the standpoint of lowering the devitrification temperature, [MgO]/([CaO]+[SrO]+[BaO]+[ZnO]) is preferably 60 or less, more preferably 55 or less, still more preferably 50 or less, especially preferably 45 or less. Since MgO is not so effective in lowering the devitrification temperature, too high a relative content thereof is prone to result in an increase in devitrification temperature.

The content of MgO, in cases when it is contained, is preferably 0.5% or higher, more preferably 1% or higher, from the standpoint of reducing the devitrification growth rate while enhancing the meltability of the glass for chemical strengthening. Meanwhile, from the standpoint of obtaining an increased surface compressive stress by chemical strengthening, the content of MgO is preferably 5% or less, more preferably 3% or less, still more preferably 1% or less.

CaO is an alkaline-earth oxide having ability to enhance strength by chemical strengthening next to MgO and is more effective in inhibiting devitrification than MgO. It is hence preferable that the glass contains CaO, from the standpoint of obtaining an increased strength by chemical strengthening while inhibiting devitrification. The content of CaO, in cases when it is contained, is preferably 0.1% or higher, more preferably 0.15% or higher, still more preferably 0.5% or higher. From the standpoint of obtaining an increased compressive stress value by a chemical strengthening treatment, the content of CaO is preferably 8% or less, more preferably 5% or less, still more preferably 3% or less, especially preferably 1% or less.

SrO is a component highly effective in inhibiting crystal precipitation, like BaO. However, as compared with BaO, SrO is less apt to pose problems, for example, in that the surface reflectance is heightened thereby. It is hence preferable that the glass contains SrO when inhibition of devitrification is important. In this case, the content of SrO is preferably 0.1% or higher, more preferably 0.5% or higher, still more preferably 1% or higher. From the standpoint of obtaining an increased compressive stress value by a chemical strengthening treatment, the content of SrO is preferably 8% or less, more preferably 5% or less, still more preferably 4% or less, especially preferably 3% or less, typically 2% or less.

The alkaline-earth oxides, etc. have the effects of enhancing the meltability of the glass and inhibiting devitrification, but there are cases where too high contents thereof inhibit strength improvement by chemical strengthening. Among the alkaline-earth oxides, etc., CaO and SrO are relatively high in the effect of inhibiting devitrification and are relatively low in tendency to impair chemical strengthening properties. Consequently, from the standpoint of obtaining a glass having various properties which are satisfactory as a whole, it is preferable that the glass contains either CaO or SrO. In this case, the total content of CaO and SrO ([CaO]±[SrO]) is preferably 1.5% or higher, more preferably 2.0% or higher, still more preferably 2.5% or higher. From the standpoint of making a surface compressive-stress layer by a chemical strengthening treatment large, the total content thereof is preferably 10% or less, more preferably 7% or less, still more preferably 5% or less.

BaO, which may be incorporated, is a component that improves the meltability of the glass for chemical strengthening. The content of BaO, in cases when it is contained, is preferably 0.1% or higher, more preferably 0.15% or higher, still more preferably 0.5% or higher. Meanwhile, in case where the content of BaO is too high, it is difficult to make a surface compressive-stress layer large by a chemical strengthening treatment. BaO considerably heightens the refractive index. Consequently, from the standpoint of obtaining a reduced refractive index to lower the surface reflectance and heighten the transmittance, the content of BaO is preferably 3% or less, more preferably 2% or less, still more preferably 1% or less, especially preferably 0.5% or less.

ZnO, which may be incorporated, is a component that improves the meltability of the glass for chemical strengthening. The content of ZnO, in cases when it is contained, is preferably 0.1% or higher, more preferably 0.15% or higher, still more preferably 0.5% or higher. Meanwhile, in case where the content of ZnO is too high, it is difficult to make a surface compressive-stress layer large by a chemical strengthening treatment. The content of ZnO is preferably 3% or less, more preferably 2% or less, still more preferably 1% or less, typically 0.5% or less.

The total content of MgO, BaO, and ZnO ([MgO]+[BaO]+[ZnO]) is preferably 5% or less, more preferably 3% or less, still more preferably 1% or less, from the standpoint of obtaining a large surface compressive stress by chemical strengthening.

$ZrO_2$ may not be contained. It is, however, preferable that the present glass contains $ZrO_2$, from the standpoint of increasing a surface compressive stress of a chemically strengthened glass. The content of $ZrO_2$ is preferably 0.1% or higher, more preferably 0.2% or higher, still more preferably 0.5% or higher, especially preferably 0.8% or higher, typically 1% or higher. Meanwhile, in case where the content of $ZrO_2$ is too high, it is difficult to make a surface compressive-stress layer large by a chemical strengthening treatment. The content of $ZrO_2$ is preferably 5% or less, more preferably 3% or less, still more preferably 2% or less, especially preferably 1.5% or less.

It is known that general-purpose glasses, when irradiated with light, undergo solarization in which a change in color and a decrease in transmittance occur due to, for example, a change in the valence of transition metal ions contained in a small amount in the glasses. $TiO_2$, although not essential, may be incorporated in order to inhibit the solarization. The content of $TiO_2$, in cases when it is contained, is preferably 0.02% or higher, more preferably 0.05% or higher, still more preferably 0.1% or higher, especially preferably 0.12% or higher, typically 0.15% or higher. Meanwhile, in case where the content of $TiO_2$ exceeds 1%, devitrification is prone to occur, resulting in the possibility of decrease in quality of a chemically strengthened glass. The content of $TiO_2$ is preferably 1% or less, more preferably 0.5% or less, still more preferably 0.25% or less.

$B_2O_3$, although not essential, may be incorporated in order to reduce the brittleness of the glass and thereby improve the crack resistance and to improve the meltability of the glass. The content of $B_2O_3$, in cases when it is contained, is preferably 0.5% or higher, more preferably 1% or higher, still more preferably 2% or higher. Meanwhile, the content of $B_2O_3$ is preferably 10% or less because too high contents thereof are prone to impair the acid resistance. The content of $B_2O_3$ is more preferably 6% or less, still more preferably 4% or less, typically 2% or less.

$P_2O_5$, although not essential, may be incorporated in order to make a surface compressive-stress layer large by chemical strengthening. The content of $P_2O_5$, in cases when it is contained, is preferably 0.5% or higher, more preferably 1% or higher, still more preferably 2% or higher. Meanwhile, from the standpoint of enhancing the acid resistance, the content of $P_2O_5$ is preferably 6% or less, more preferably 4% or less, still more preferably 2% or less. From the standpoint of preventing the occurrence of striae during melting, it is more preferable that $P_2O_5$ is substantially not contained.

The total content of $B_2O_3$ and $P_2O_5$ ([$B_2O_3$]±[$P_2O_5$]) is preferably 0-10%, more preferably 1% or higher, still more preferably 2% or higher. The total content thereof is more preferably 6% or less, still more preferably 4% or less.

$La_2O_3$, $Nb_2O_5$, $Ta_2O_5$, and $Gd_2O_3$ are components which lower the devitrification growth rate of the glass and improve the meltability, and may be incorporated. In cases when these components are contained, the content of each component is preferably 0.1% or higher, more preferably 0.2% or higher, still more preferably 0.5% or higher, especially preferably 0.8% or higher, typically 1% or higher. Meanwhile, in the case of too high contents thereof, it is difficult to make a surface compressive-stress layer large by a chemical strengthening treatment. Consequently the content of each of those components is preferably 3% or less, more preferably 2% or less, still more preferably 1% or less, especially preferably 0.5% or less.

$Fe_2O_3$ absorbs heat rays and hence has the effect of improving the meltability of the glass. In the case where the glass is mass-produced using a large melting furnace, it is preferable that the glass contains $Fe_2O_3$. The content thereof in this case, in terms of % by weight on an oxide basis, is preferably 0.002% or higher, more preferably 0.005% or higher, still more preferably 0.007% or higher, especially preferably 0.01% or higher. Meanwhile, too high contents thereof result in a coloration. Hence, from the standpoint of enhancing the transparency of the glass, the content thereof in terms of % by weight on an oxide basis is preferably 0.3% or less, more preferably 0.04% or less, still more preferably 0.025% or less, especially preferably 0.015% or less.

In the explanation given above, the iron oxides which can be contained in the glass were all taken as $Fe_2O_3$. Actually, however, Fe(III) of an oxidized state usually coexists with Fe(II) of a reduced state. Of these, Fe(III) causes a yellow coloration and Fe(II) causes a blue coloration. A balance therebetween causes a green coloration to the glass.

Coloring ingredients may be added so long as the desired chemical strengthening properties are not impaired thereby. Suitable examples of the coloring ingredients include $Co_3O_4$, $MnO_2$, NiO, CuO, $Cr_2O_3$, $V_2O_5$, $Bi_2O_3$, $SeO_2$, $CeO_2$, $Er_2O_3$, and $Nd_2O_3$.

The total content of these coloring ingredients is preferably 5% or less. In case where the total content thereof exceeds 5%, the glass may be prone to be devitrified. The total content thereof is more preferably 3% or less, still more preferably 1% or less. In the case where the glass is desired to have a heightened transmittance, it is preferable that those ingredients are substantially not contained.

The glass may suitably contain $SO_3$, a chloride, a fluoride, or the like as a refining agent for use in glass melting. It is preferable that the glass contains no $As_2O_3$. In cases when $Sb_2O_3$ is contained, the content thereof is preferably 0.3% or less, more preferably 0.1% or less. It is most preferable that the glass contains no $Sb_2O_3$.

The β-OH value, which is an index to the water content of the glass, is preferably 0.1 mm$^{-1}$ or larger, more preferably 0.15 mm$^{-1}$ or larger, still more preferably 0.2 mm$^{-1}$ or larger, especially preferably 0.22 mm$^{-1}$ or larger, most preferably 0.25 mm$^{-1}$ or larger.

Glasses having a large β-OH value tend to have a lowered softening point and be easy to be bent. Meanwhile, glasses having an increased β-OH value show a reduced surface compressive stress (CS) after a chemical strengthening treatment and are difficult to be strengthened. Consequently, the β-OH value is preferably 0.5 mm$^{-1}$ or less, more preferably 0.4 mm$^{-1}$ or less, still more preferably 0.3 mm$^{-1}$ or less.

The temperature (T4) at which the glass has a viscosity of $10^4$ dPa·s is preferably 1,300° C. or lower, more preferably 1,250° C. or lower, still more preferably 1,200° C. or lower, especially preferably 1,150° C. or lower. The temperature (T4) is a criterion indicating a forming temperature at which the glass is formed into a sheet shape. Glasses having a high T4 tend to impose a larger load on the forming equipment. Glasses having a low T4 may have poor stability. The T4 is usually 900° C. or higher, preferably 950° C. or higher, more preferably 1,000° C. or higher, still more preferably 1,050° C. or higher.

The temperature (T2) at which the glass has a viscosity of $10^2$ dPa·s is preferably 1,800° C. or lower, more preferably 1,750° C. or lower, still more preferably 1,700° C. or lower, especially preferably 1,650° C. or lower, typically 1,600° C. or lower. The temperature (T2) is a criterion indicating a melting temperature of the glass. The lower the T2, the easier the glass production. Glasses having a low T2 may have poor stability. The T2 of the present glass is usually 1,400° C. or higher, preferably 1,450° C. or higher.

The devitrification temperature of the present glass is preferably not higher than the temperature (T4+120° C.) which is higher by 120° C. than the temperature (T4) at which the glass has a viscosity of $10^4$ dPa·s, because the present glass having such devitrification temperature is less apt to be devitrified when formed by the float process. The devitrification temperature thereof is more preferably not higher than the temperature which is higher than T4 by 100° C., still more preferably not higher than the temperature which is higher than T4 by 50° C., especially preferably not higher than T4.

The devitrification temperature of the present glass is preferably not higher than the temperature (T2−350° C.) which is lower by 350° C. than the temperature (T2) at which the glass has a viscosity of $10^2$ dPa·s, because the present glass having such devitrification temperature is less apt to be devitrified during melting. The devitrification temperature thereof is more preferably not higher than T2−400° C.

There are cases where glasses less apt to be devitrified even in a high-viscosity state are less strengthened by a chemical strengthening treatment. Consequently, the devitrification temperature is preferably not lower than the temperature (T5.5) at which the glass has a viscosity of $10^{5.5}$ dPa·s, more preferably not lower than the temperature (T5.2) at which the glass has a viscosity of $10^{5.2}$ dPa·s, still more preferably not lower than the temperature (T5) at which the glass has a viscosity of $10^5$ dPa·s.

The present glass preferably has a devitrification growth rate at 850-1,200° C. of 600 μm/h or less, because devitrification, even if having occurred, does not grow. The devitrification growth rate at 850-1,200° C. is more preferably 500 μm/h or less, still more preferably 400 μm/h or less, especially preferably 300 μm/h or less. It is preferable that the present glass has a maximum devitrification growth rate at 700-1,200° C. of 600 μm/h or less.

The present glass has a devitrification growth rate at 950° C. of preferably 600 μm/h or less, more preferably 500 μm/h or less, still more preferably 400 μm/h or less, especially preferably 300 μm/h or less.

The present glass has a glass transition point (Tg) of preferably 500° C. or higher, more preferably 520° C. or higher, still more preferably 540° C. or higher, from the standpoint of inhibiting the glass from warping through chemical strengthening. From the standpoint of facilitating float-process forming, the Tg thereof is preferably 750° C. or lower, more preferably 700° C. or lower, still more preferably 650° C. or lower, especially preferably 600° C. or lower, most preferably 580° C. or lower.

The present glass has a softening point of preferably 900° C. or lower, more preferably 850° C. or lower, still more preferably 820° C. or lower, especially preferably 790° C. or lower. The lower the softening point of the glass, the lower the heat treatment temperature in bending. Lower softening points hence not only reduce the energy consumed in the bending step but also reduce the load imposed on the equipment. The lower the softening point, the more preferred from the standpoint of lowering the bending temperature. However, the softening points of ordinary glasses for chemical strengthening are 700° C. or higher. From the standpoint of avoiding a phenomenon in which the stress introduced by a chemical strengthening treatment relaxes undesirably, the softening point of the present glass is preferably 700° C. or higher, more preferably 720° C. or higher, still more preferably 740° C. or higher.

The softening point can be measured by the fiber elongation method described in JIS R3103-1:2001.

It is preferable that the present glass has a crystallization peak temperature higher than the softening point. It is more preferable that no crystallization peak is observed.

The crystallization peak temperature can be determined by crushing an about 70-mg of the glass, grinding the glass particles with an agate mortar, and examining the resultant powder with a differential scanning calorimeter (DSC) with heating from room temperature to 1,000° C. at a heating rate of 10° C./min.

The present glass has a Young's modulus of preferably 80 GPa or higher, more preferably 82 GPa or higher, still more preferably 84 GPa or higher, especially preferably 85 GPa or higher, from the standpoint of rendering the glass less apt to scatter broken pieces upon breakage. Glasses having a high Young's modulus may have reduced acid resistance. The Young's modulus of the present glass is, for example, 110 GPa or less, and is preferably 100 GPa or less, more preferably 90 GPa or less. The Young's modulus can be measured, for example, by an ultrasonic pulse method.

The present glass has a density of preferably 3.0 g/cm$^3$ or less, more preferably 2.8 g/cm$^3$ or less, still more preferably 2.6 g/cm³ or less, especially preferably 2.55 g/cm³ or less, from the standpoint of obtaining products reduced in weight. Glasses having a low density tend to be low in acid resistance, etc. The density of the present glass is, for example, 2.3 g/cm³ or higher, and is preferably 2.4 g/cm³ or higher, especially preferably 2.45 g/cm³ or higher.

The present glass has a refractive index of preferably 1.6 or less, more preferably 1.58 or less, still more preferably 1.56 or less, especially preferably 1.54 or less, from the standpoint of reducing the surface reflection of visible light. Glasses having a low refractive index tend to have low acid resistance. The refractive index of the present glass is, for example, 1.5 or higher, and is preferably 1.51 or higher, more preferably 1.52 or higher.

The present glass has a photoelastic constant of preferably 33 nm/cm/MPa or less, more preferably 32 nm/cm/MPa or less, still more preferably 31 nm/cm/MPa or less, especially preferably 30 nm/cm/MPa or less, from the standpoint of reducing the optical strain. Meanwhile, since glasses having a small photoelastic constant tend to have low acid resistance, the photoelastic constant of the present glass is, for example, preferably 24 nm/cm/MPa or higher, more preferably 25 nm/cm/MPa or higher, still more preferably 26 nm/cm/MPa or higher.

The present glass has an average coefficient of linear thermal expansion at 50-350° C. (coefficient of thermal expansion) of preferably $95 \times 10^{-7}$/° C. or less, more preferably $90 \times 10^{7}$/° C. or less, still more preferably $88 \times 10^{7}$/° C. or less, especially preferably $86 \times 10^{7°}$ C. or less, most preferably $84 \times 10^{-7}$/° C. or less, from the standpoint of inhibiting the glass from warping through chemical strengthening. Glasses having a low coefficient of thermal expansion may be difficult to melt. The coefficient of thermal expansion of the present glass is, for example, $60 \times 10^{-7}$/° C. or higher, and is preferably $70 \times 10^{-7}$/° C. or higher, more preferably $74 \times 10^{-7}$/° C. or higher, still more preferably $76 \times 10^{-7}$/° C. or higher.

The present glass has a fictive temperature which is preferably not higher than the temperature (Tg+80° C.) higher than the glass transition point (Tg) by 80° C., more preferably not higher than Tg+50° C., still more preferably not higher than Tg+40° C., yet still more preferably not higher than Tg+30° C., even still more preferably not higher than Tg+20° C., especially preferably not higher than Tg+10° C., from the standpoint of obtaining an increase in surface compressive stress by chemical strengthening.

In the case of obtaining a glass by melting raw materials for the glass at a high temperature and cooling the melt, the fictive temperature of the glass decreases as the rate of cooling after the melting decreases. It is hence necessary, for obtaining a glass having a very low fictive temperature, that the melt should be gradually cooled over a long time period. In the case of gradually cooling a glass, the glass, depending on the composition thereof, is prone to undergo a devitrification phenomenon in which crystals precipitate and grow to large crystals during the cooling. From the standpoint of inhibiting the devitrification during cooling, the fictive temperature of the present glass is preferably Tg-30° C. or higher, more preferably Tg-10° C. or higher, still more preferably Tg or higher, especially preferably Tg+10° C. or higher.

The fictive temperature of a glass can be experimentally determined from the refractive index of the glass. A plurality of glass pieces having the same glass composition and differing in fictive temperature are produced beforehand by a method in which a glass which has been held at certain temperatures is rapidly cooled from those temperatures. Since the fictive temperatures of these glass pieces are the temperatures at which the glass has been held before the rapid cooling, a calibration curve can be prepared by measuring the refractive indexes of these glass pieces and plotting the refractive indexes against the fictive temperatures. An example is shown in FIG. 1. Even in the case of a glass produced under unknown cooling rate or the like, the fictive temperature thereof can be determined from the calibration curve by measuring the refractive index of the glass.

However, a difference in glass composition results in a difference in calibration curve. It is hence necessary to use a calibration curve prepared using glasses having the same composition as the glass, the fictive temperature of which is desired to be determined.

The fictive temperature of a glass depends on the cooling rate used for cooling the molten glass. There is a tendency that the higher the cooling rate, the higher the fictive temperature and that the lower the cooling rate, the lower the fictive temperature. There also is a tendency that the lower the fictive temperature, the larger the surface compressive stress after chemical strengthening.

It is preferable that the present glass, after having been subjected as a glass sheet having a thickness of 0.8 mm to two-stage chemical strengthening consisting of 3-hour immersion in 450° C. sodium nitrate and subsequent 1.5-hour immersion in 450° C. potassium nitrate, has a surface compressive stress of 950 MPa or higher and a depth of surface compressive-stress layer of 100 μm or larger. The surface compressive stress is the CS2 which will be described later, that is, the surface compressive stress due to an Na—K ion-exchange layer; and the depth of surface compressive-stress layer is the DOC3 which will be described later, that is, the depth of surface compressive-stress layer due to an Li—Na ion-exchange layer.

In the case where the present glass is chemically strengthened by 1-hour immersion in 450° C. sodium nitrate, the resultant surface compressive stress value (CS1) is preferably 100 MPa or larger, more preferably 150 MPa or larger, still more preferably 200 MPa or larger, especially preferably 250 MPa or larger, typically 300 MPa or larger. The larger the CS1, the more preferred from the standpoint of enhancing the strength. However, from the standpoint of inhibiting strengthening cracking in a chemical strengthening treatment step, the CS1 is preferably, for example, 600 MPa or less, more preferably 500 MPa or less, still more preferably 400 MPa or less.

The depth of compressive-stress layer (DOC1) in this case is preferably 70 μm or larger, more preferably 80 μm or larger, still more preferably 90 μm or larger, especially preferably 100 μm or larger. Meanwhile, from the standpoint of avoiding a decrease in yield due to strengthening cracking in a chemical strengthening treatment step, the DOC1 is preferably, for example, 200 μm or less, more preferably 150 μm or less, still more preferably 130 μm or less, especially preferably 120 μm or less.

The CS1 and the DOC1 can be measured using a scattered-light photoelastic stress meter (e.g., SLP-1000, manufactured by Orihara Industrial Co., Ltd.), or can be determined using birefringence imaging system Abrio-IM, manufactured by Tokyo Instruments, Inc., in the following manner.

A cross-section of a chemically strengthened glass having a size of 10 mm×10 mm or larger and a thickness of about 0.2-2 mm is polished to a range of 150-250 μm, and a thin section is prepared therefrom. The thus-obtained thin section sample having a thickness of 150-250 μm is irradiated with monochromatic light with a wavelength of 546 nm as light source to examine the sample by means of the transmitted light. The chemically strengthened glass is thus examined for retardation with the birefringence imaging system, and a stress is calculated from the obtained value using the following Expression (2).

$$1.28 \times F = \delta/(C \times t')$$  Expression (2)

In Expression (2), F is stress (unit: MPa), δ is retardation (unit: nm), C is photoelastic constant (unit: nm/cm/MPa), and t' is sample thickness (unit: cm).

The present glass, after having been chemically strengthened by immersing the glass in 450° C. sodium nitrate for 3 hours and then immersing the glass in 450° C. potassium nitrate for 1.5 hours, has a surface compressive stress value CS2, which is due to an Na—K ion-exchange layer, of preferably 950 MPa or larger, more preferably 1,000 MPa or larger, still more preferably 1,050 MPa or larger, yet still more preferably 1,100 MPa or larger, especially 1,150 MPa or larger. Meanwhile, there is no particular upper limit on CS2. However, in the case where it is desired to minimize the decrease in yield due to strengthening cracking in a chemical strengthening treatment step, the CS2 is preferably 1,500 MPa or less, more preferably 1,300 MPa or less, still more preferably 1,200 MPa or less, especially preferably 1,100 MPa or less.

Furthermore, the present glass having a thickness of 0.8 mm, after having been strengthened by immersing the glass in 450° C. sodium nitrate for 3 hours and then immersing the glass in 450° C. potassium nitrate for 1.5 hours, has a depth of surface compressive-stress layer DOC2, which is due to the Na—K ion-exchange layer, of preferably 3 μm or larger, more preferably 4 μm or larger, still more preferably 5 μm or larger, yet still more preferably 7 μm or larger, especially preferably 9 μm or larger. From the standpoint of heightening the yield of the strengthened glass, the DOC2 is preferably 20 μm or less, more preferably 15 μm or less, still more preferably 8 μm or less, especially preferably 6 μm or less.

The CS2 and the DOC2 can be measured, for example, using surface stress meter FSM-6000, manufactured by Orihara Industrial Co., Ltd.

The present glass, after having been chemically strengthened by immersing the glass in 450° C. sodium nitrate for 3 hours and then immersing the glass in 450° C. potassium nitrate for 1.5 hours, has a depth of compressive-stress layer DOC3, which is due to an Li—Na ion-exchange layer, of preferably 100 μm or larger, more preferably 110 μm or larger, still more preferably 120 μm or larger, especially preferably 130 μm or larger. Meanwhile, there is no particular upper limit on DOC3. However, in cases when the decrease in yield due to strengthening cracking in a chemical strengthening treatment step is taken into account, the DOC3 is, for example, preferably 200 μm or less, more preferably 180 μm or less, still more preferably 170 μm or less, especially preferably 160 μm or less.

The glass having a thickness of 0.8 mm, after having been immersed in 450° C. sodium nitrate for 3 hours and then immersed in 450° C. potassium nitrate for 1.5 hours, has a compressive stress value CS3, which is due to the Li—Na ion-exchange layer, of preferably 100 MPa or larger, more preferably 150 MPa or larger, still more preferably 180 MPa or larger, especially preferably 200 MPa or larger. From the standpoint of preventing the yield from being reduced by strengthening cracking, the CS3 is preferably 400 MPa or less, more preferably 350 MPa or less, still more preferably 300 MPa or less, especially preferably 250 MPa or less.

The CS3 and the DOC3 can be determined using a scattered-light photoelastic stress meter (e.g., SLP-1000, manufactured by Orihara Industrial Co., Ltd.) or birefringence imaging system Abrio-IM manufactured by Tokyo Instruments Inc. by the method described above.

The glass for chemical strengthening of the present invention can be produced by ordinary methods. For example, raw materials for components of the glass are mixed, and the mixture is heated and melted in a glass melting furnace. Thereafter, the glass is homogenized by a known method, formed into a desired shape such as a glass sheet, and then annealed.

Examples of methods for forming into a glass sheet include a float process, a pressing process, a fusion process, and a downdraw process. Especially preferred is the float process, which is suitable for mass production. Also preferred are continuous forming methods other than the float process, such as the fusion process and the downdraw process.

Thereafter, the thus-formed glass is ground and polished according to need to form a glass substrate. In the case where the glass substrate is cut into a desired shape and size or is chamfered, it is preferable that the cutting or chamfering of the glass substrate is conducted before the glass substrate is subjected to the chemical strengthening treatment which will be described later. This is because in the chemical strengthening treatment performed after the cutting or chamfering, a compressive-stress layer is formed also in the end surfaces.

Chemically Strengthened Glass

The chemically strengthened glass of the present invention has a base composition which is equal to the glass composition of the glass for chemical strengthening described above. The chemically strengthened glass of the present invention has a surface compressive stress of preferably 800 MPa or larger, more preferably 950 MPa or larger, still more preferably 1,000 MPa or larger, especially preferably 1,150 MPa or larger.

The chemically strengthened glass has a depth of compressive-stress layer of preferably 100 μm or larger, more preferably 110 μm or larger, still more preferably 120 μm or larger, especially preferably 130 μm or larger.

The chemically strengthened glass of the present invention can be produced by subjecting a glass sheet constituted of the glass for chemical strengthening of the present invention to a chemical strengthening treatment and then cleaning and drying the treated glass sheet.

The chemical strengthening treatment can be conducted by known methods. In the chemical strengthening treatment, the glass sheet is brought into contact, by immersion, etc., with the melt of a metal salt (e.g., potassium nitrate) containing metal ions having a large ionic radius (typically, K ions), thereby replacing metal ions having a small ionic radius (typically, Na ions or Li ions) contained in the glass sheet by ions of the metal having a large ionic radius (typically, K ions for replacing Na ions, or Na ions for replacing Li ions).

The chemical strengthening treatment (ion-exchange treatment) can be conducted, for example, by immersing the glass sheet for 0.1-500 hours in a molten salt, e.g., potassium nitrate, heated to 360-600° C. The heating temperature for the molten salt is more preferably 375° C. or higher and more preferably 500° C. or lower. The time period of the glass sheet immersion in the molten salt is more preferably 0.3 hours or longer and more preferably 200 hours or less.

Examples of the molten salt for conducting the chemical strengthening treatment include nitrates, sulfates, carbonates, and chlorides. Examples of the nitrates, among these, include lithium nitrate, sodium nitrate, potassium nitrate, cesium nitrate, and silver nitrate.

Examples of the sulfates include lithium sulfate, sodium sulfate, potassium sulfate, cesium sulfate, and silver sulfate. Examples of the carbonates include lithium carbonate, sodium carbonate, and potassium carbonate. Examples of the chlorides include lithium chloride, sodium chloride, potassium chloride, cesium chloride, and silver chloride. One of these molten salts may be used alone, or two or more thereof may be used in combination.

In the present invention, conditions for the chemical strengthening treatment are not particularly limited, and suitable conditions may be selected while taking account of, for example, the properties and composition of the glass, kinds of the molten salts, and chemical strengthening properties such as surface compressive stress and the depth of compressive-stress layer, which the chemically strengthened glass to be finally obtained is desired to have.

In the present invention, a chemical strengthening treatment may be conducted only once, or a plurality of chemical strengthening treatments (multistage strengthening) may be conducted under two or more different sets of conditions. In cases when, for example, a first-stage chemical strengthening treatment is conducted under such conditions as to result in a large DOC and a relatively small CS and thereafter a second-stage chemical strengthening treatment is conducted under such conditions as to result in a small DOC and a relatively large CS, then a chemically strengthened glass is obtained in which the outermost surface has an enhanced CS and the internal tensile stress area (St) can be reduced. As a result, the internal tensile stress (CT) can be kept small.

In the case where the glass for chemical strengthening of the present invention is in the shape of a sheet (glass sheet), the thickness (t) thereof is, for example, 2 mm or less and is preferably 1.5 mm or less, more preferably 1 mm or less, from the standpoint of heightening the effect of chemical strengthening. From the standpoint of attaining a heightened cooling rate during glass sheet forming to thereby inhibit devitrification, the thickness thereof is more preferably 0.9 mm or less, especially preferably 0.8 mm or less, most preferably 0.7 mm or less. Meanwhile, from the standpoint of attaining an effect of sufficient improvement of strength by a chemical strengthening treatment, the sheet thickness is, for example, 0.1 mm or larger and is preferably 0.2 mm or larger, more preferably 0.4 mm or larger, still more preferably 0.5 mm or larger.

The shape of the present glass may be any shape other than sheet shape, depending on products to which the glass is applied or on intended uses thereof, etc. The glass sheet may have, for example, a trimmed-edge shape in which the periphery has different thicknesses. The shape of the glass sheet is not limited thereto. For example, the two main surfaces may not be parallel with each other, or either or both of the two main surfaces may be a curved surface in a part or entire of them. More specifically, the glass sheet may be, for example, a flat glass sheet having no warpage or may be a curved glass sheet having a curved surface.

The present glass is especially useful as cover glasses for use in, for example, mobile appliances such as cell phones, smartphones, personal digital assistants (PDAs), or tablet terminals. Furthermore, the present glass is suitable for use as the cover glasses of non-portable display devices, e.g., TVs, personal computers (PC), and tough panels, wall surfaces of elevators, wall surfaces (full-size displays) of architecture such as houses or buildings, building materials, e.g., window glasses, table tops, interior materials for motor vehicles, airplanes, etc., or the cover glasses of such materials, and is also suitable for applications such as housings having a curved surface shape.

Examples

The present invention is explained below by reference to Examples, but the invention is not limited thereto. Examples 1 to 3 are comparative examples, and Examples 4 to 11 are working examples. With respect to the results of measurements shown in the tables, each blank indicates that no measurement was made.

Preparation of Glasses for Chemical Strengthening

Glass sheets were prepared through melting with a platinum crucible so as to result in the glass compositions shown in Tables 1 and 2 in terms of mole percentage on an oxide basis. Raw materials for glass were suitably selected from common raw materials including oxides, hydroxides, carbonates, and nitrates and weighed and mixed so as to result in a glass amount of 1,000 g. Subsequently, each raw-material mixture was put into the platinum crucible, and this crucible was introduced into a resistance-heating electric furnace of 1,500-1,700° C., where the mixture was melted, degassed, and homogenized for about 3 hours. The molten glass obtained was poured into a mold, held therein at a temperature of [glass transition point]+50° C. for 1 hour, and then cooled to room temperature at a rate of 0.5° C./min, thereby obtaining a glass block. The glass blocks obtained were cut and ground, and the both surfaces of each glass block were finally mirror-polished. Thus, sheet-shaped glasses each having dimensions of 50 mm (length)×50 mm (width)×0.8 mm (thickness) were obtained.

These glasses were evaluated for properties in the following manners. The results are shown in Tables 1 and 2.

Density

Density (d) was measured by Archimedes' method. The unit is $g/cm^3$.

Young's Modulus

A glass which had not been chemically strengthened yet was examined for Young's modulus (E) (unit; GPa) by an ultrasonic pulse method (JIS R1602:1995).

Average Coefficient of Linear Thermal Expansion and Glass Transition Point (Tg)

An average coefficient of linear thermal expansion (a) at temperatures of 50-350° C. (unit; $10^{-7}/°$ C.) and a glass transition point (Tg) (unit; ° C.) were determined in accordance with the "Test Method for Average Coefficient of Linear Thermal Expansion of Glass" specified JIS R3102: 1995.

T2, T4

A glass which had not been chemically strengthened yet was examined for temperature T2 (Tlogη=2: unit; ° C.) resulting in a viscosity of $10^2$ dPa·s and for temperature T4

(Tlogη=4: unit; ° C.) resulting in a viscosity of $10^4$ dPa·s, with a rotary viscometer (in accordance with ASTM C 965-96).

Devitrification Growth Rate

Devitrification growth rate was determined in the following manner.

Glass pieces were crushed with a mortar and classified. Glass particles which had passed through a 3.35-mm-mesh sieve and had not passed through 2.36-mm-mesh sieve were washed with ion-exchanged water and dried. The dried glass particles were tested.

Figure 2:
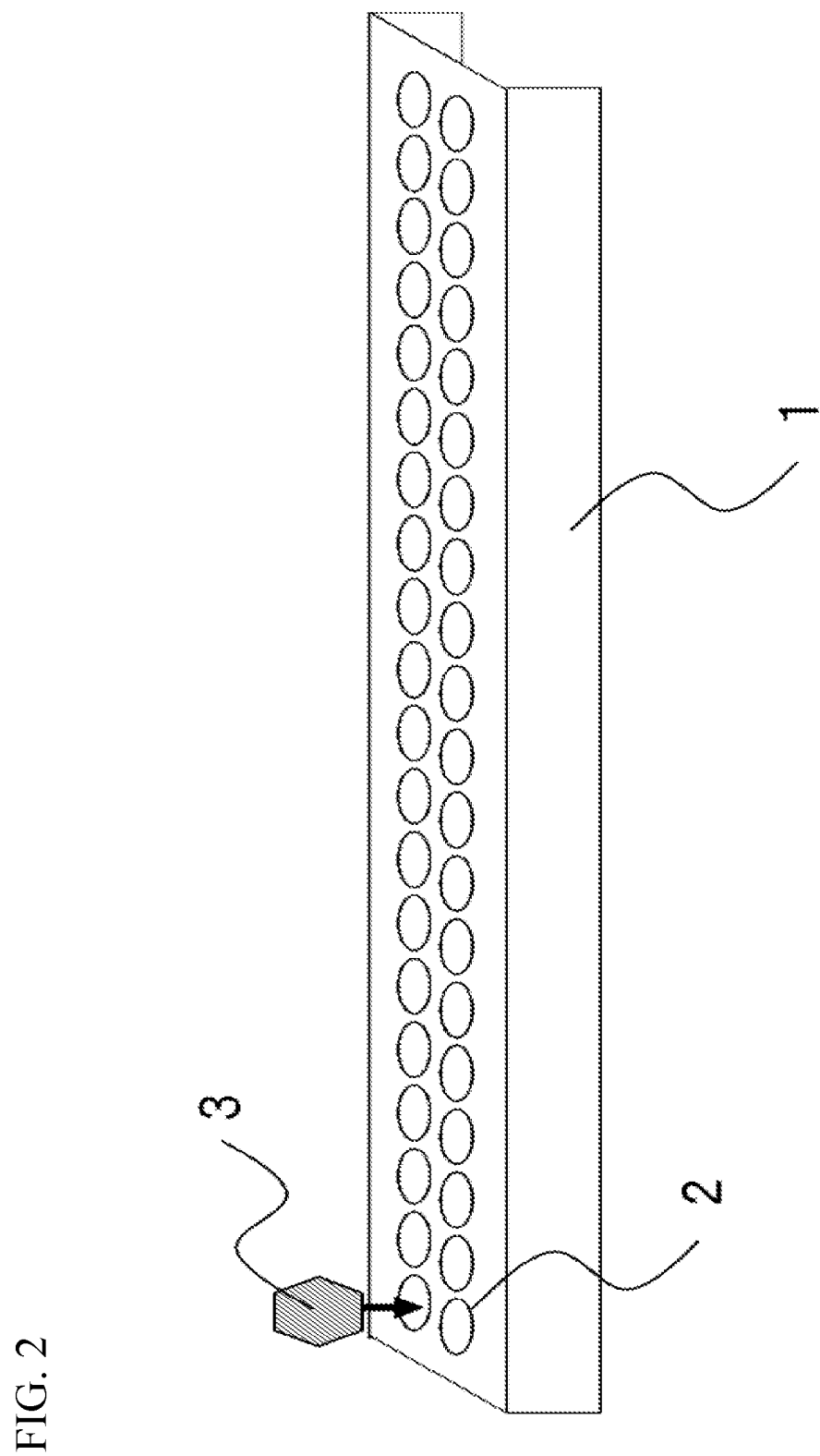
FIG. 2 is a diagrammatic view of a platinum vessel used for determining a devitrification growth rate.

A long and narrow platinum vessel (platinum vessel 1 for devitrification evaluation) having many recesses with a diameter of about 3 mm, such as that shown in FIG. 2, was used. The glass particles 3 were placed in the recesses 2 so that one glass particle 3 was put in one recess 2. This platinum vessel was heated in an electric furnace of 1,000-1,100° C. until the surfaces of the glass particles melted to become smooth.

Subsequently, these glasses were introduced into a temperature-gradient furnace kept at given temperatures and heat-treated for a certain time period (referred to as T). Thereafter, the glasses were rapidly cooled by taking out the vessel from the furnace and placing it in a room-temperature atmosphere. According to this method, since a large number of glass particles can be simultaneously heat-treated using the long and narrow vessel disposed in a temperature-gradient furnace, it is possible to measure a maximum devitrification growth rate at temperatures within a given range.

The heat-treated glass was examined with a polarization microscope (ECLIPSE LV100ND, manufactured by Nikon Corp.), and the diameter (L (μm)) of the largest of the crystals observed was measured. The examination was made under the conditions of an ocular-lens magnification of 10 times, an objective-lens magnification of 5-100 times, transmitted light, and polarization examination. It can be thought that crystals due to devitrification grow isotropically and hence the devitrification growth rate is L/(2T) (unit: μm/h).

Crystals to be examined were selected from ones which had not precipitated from the interface between the glass and the vessel. Crystal growth on the metal interface tends to differ from the behavior of devitrification growth inside the glass or at the glass-atmosphere interface.

Devitrification Test

Glass particles were put, in an appropriate amount, on a platinum dish having a diameter of 15-30 mm and a depth of about 4 mm and heat-treated at a temperature lower than T4 by 20° C. for 17 hours in an electric furnace having a constant temperature. The heat-treated glass was examined with a polarization microscope for observing presence or absence of devitrification.

Refractive Index

Using a precision refractometer (KPR-2000, manufactured by Shimadzu Corp.), refractive index nd was measured with respect to d-line (He illuminant; wavelength, 587.6 nm).

Photoelastic Constant (Photoelastic Multiplier)

A measurement was made using a sodium lamp as an illuminant by the disk compression method described in Yogyo Kyokai-shi, Vol. 87 (1979), No. 1010, p. 519. The unit is nm/cm/MPa.

Chemical Strengthening Properties

The surface compressive stresses CS1 and CS3 (unit: MPa) and the depths of compressive-stress layer DOC1 and DOC3 (unit: μm) were measured using measuring device SLP1000, manufactured by Orihara Industrial Co., Ltd. The surface compressive stress (CS2) (unit: MPa) and the depth of compressive-stress layer (DOC2) (unit: μm) were measured using surface stress meter FSM-6000, manufactured by Orihara Industrial Co., Ltd.

The CS1 and DOC1 given in the tables indicate values of surface compressive stress and depth of compressive-stress layer, respectively, measured after one-stage strengthening in which obtained glasses for chemical strengthening were chemically strengthened by 1-hour immersion in 450° C. sodium nitrate. The CS2 and the DOC2 indicate values of surface compressive stress and depth of compressive-stress layer, respectively, due to an Na—K ion-exchange layer, measured after two-stage strengthening in which obtained glasses for chemical strengthening were chemically strengthened by 3-hour immersion in 450° C. sodium nitrate and subsequent 1.5-hour immersion in 450° C. potassium nitrate. The CS3 and the DOC3 indicate values of surface compressive stress and depth of compressive-stress layer, respectively, due to an Li—Na ion-exchange layer, measured after two-stage strengthening in which obtained glasses for chemical strengthening were chemically strengthened by 3-hour immersion in 450° C. sodium nitrate and subsequent 1.5-hour immersion in 450° C. potassium nitrate. The CS3 indicates values corresponding to a profile depth of 0 μm, the values being determined by obtaining a stress profile of the Li—Na ion-exchange layer in a region of depths larger than 50 μm and fitting the stress profile with an error function.

The results are shown in Tables 3 and 4.

TABLE 1

|  | Ex. 1 | Ex. 2 | Ex. 3 | Ex. 4 | Ex. 5 | Ex. 6 |
| --- | --- | --- | --- | --- | --- | --- |
| $SiO_2$ | 68.96 | 69.96 | 62.96 | 63.16 | 63.16 | 63.16 |
| $Al_2O_3$ | 9.0 | 7.5 | 14.3 | 14.3 | 14.3 | 14.3 |
| $B_2O_3$ | 0.0 | 0.0 | 0.0 | 0.0 | 0.0 | 0.0 |
| $P_2O_5$ | 0.0 | 0.0 | 0.0 | 0.0 | 0.0 | 0.0 |
| MgO | 6.0 | 7.0 | 4.0 | 0.0 | 0.0 | 0.0 |
| CaO | 0.0 | 0.2 | 0.2 | 4.0 | 0.0 | 2.0 |
| SrO | 0.0 | 0.0 | 0.0 | 0.0 | 4.0 | 2.0 |
| BaO | 0.0 | 0.0 | 0.0 | 0.0 | 0.0 | 0.0 |

TABLE 1-continued

|  | Ex. 1 | Ex. 2 | Ex. 3 | Ex. 4 | Ex. 5 | Ex. 6 |
|---|---|---|---|---|---|---|
| ZnO | 0.0 | 0.0 | 0.0 | 0.0 | 0.0 | 0.0 |
| $ZrO_2$ | 1.0 | 1.0 | 1.0 | 1.0 | 1.0 | 1.0 |
| $TiO_2$ | 0.04 | 0.04 | 0.04 | 0.04 | 0.04 | 0.04 |
| $Li_2O$ | 9.5 | 8.0 | 7.0 | 7.0 | 7.0 | 7.0 |
| $Na_2O$ | 4.5 | 5.3 | 7.5 | 7.5 | 7.5 | 7.5 |
| $K_2O$ | 1.0 | 1.0 | 3.0 | 3.0 | 3.0 | 3.0 |
| CaO + SrO | 0.0 | 0.2 | 0.2 | 4.0 | 4.0 | 4.0 |
| $Na_2O + K_2O$ | 5.5 | 6.3 | 10.5 | 10.5 | 10.5 | 10.5 |
| $(Li_2O + K_2O)/Al_2O_3$ | 1.2 | 1.2 | 0.7 | 0.7 | 0.7 | 0.7 |
| MgO + BaO + ZnO | 6.0 | 7.0 | 4.0 | 0.0 | 0.0 | 0.0 |
| $B_2O_3 + P_2O_5$ | 0.0 | 0.0 | 0.0 | 0.0 | 0.0 | 0.0 |
| d | 2.44 | 2.44 | 2.47 | 2.49 | 2.55 | 2.52 |
| α | 70 | 72 | 85 | 87 | 89 | 88 |
| Tg | 550 | 548 | 586 | 567 | 557 | 564 |
| E | 84 | 83 | 82 | 81 | 82 | 85 |
| Tlogη = 2 | 1625 | 1629 | 1665 | 1649 | 1649 | 1640 |
| Tlogη = 4 | 1163 | 1159 | 1213 | 1187 | 1185 | 1181 |
| Refractive index nd | 1.517 | 1.517 | 1.515 | 1.519 | 1.520 | 1.513 |
| Photoelastic multiplier | 28.7 | 28.9 | 27.7 | 27.3 | 27.1 | 27.2 |
| Devitrification test | absent | absent | present | absent | absent | absent |
| Devitrification growth rate | 450 | 80 |  |  |  | 90 |

TABLE 2

|  | Ex. 7 | Ex. 8 | Ex. 9 | Ex. 10 | Ex. 11 |
|---|---|---|---|---|---|
| $SiO_2$ | 62.7 | 60.0 | 60.0 | 64.0 | 67.0 |
| $Al_2O_3$ | 14.3 | 15.0 | 16.0 | 15.0 | 15.0 |
| $B_2O_3$ | 0.0 | 3.0 | 6.0 | 4.5 | 2.0 |
| $P_2O_5$ | 0.0 | 0.0 | 0.0 | 0.0 | 0.0 |
| MgO | 0.0 | 0.0 | 0.0 | 1.0 | 0.0 |
| CaO | 1.5 | 1.0 | 1.0 | 0.5 | 1.5 |
| SrO | 2.0 | 1.0 | 1.0 | 1.5 | 0.5 |
| BaO | 0.0 | 0.0 | 0.0 | 0.0 | 0.0 |
| ZnO | 0.0 | 0.0 | 0.0 | 0.0 | 0.0 |
| $ZrO_2$ | 1.0 | 2.0 | 1.0 | 0.0 | 1.0 |
| $Li_2O$ | 8.0 | 12.0 | 10.0 | 9.0 | 5.0 |
| $Na_2O$ | 7.5 | 3.0 | 5.0 | 4.5 | 8.0 |
| $K_2O$ | 3.0 | 3.0 | 0.0 | 0.0 | 0.0 |
| CaO + SrO | 3.5 | 2.0 | 2.0 | 2.0 | 2.0 |
| $Na_2O + K_2O$ | 10.5 | 6.0 | 5.0 | 4.5 | 8.0 |
| $(Li_2O + K_2O)/Al_2O_3$ | 0.8 | 1.0 | 0.6 | 0.6 | 0.3 |
| MgO + BaO + ZnO | 0.0 | 0.0 | 0.0 | 1.0 | 0.0 |
| $B_2O_3 + P_2O_5$ | 0.0 | 3.0 | 6.0 | 4.5 | 2.0 |
| d | 2.52 | 2.49 | 2.45 | 2.43 | 2.45 |
| α | 89 | 81 | 72 | 68 | 68 |
| Tg | 551 | 559 | 580 | 587 | 638 |
| E | 84 | 83 | 82 | 82 | 82 |
| Tlogη = 2 | 1615 | 1581 | 1624 | 1684 | 1782 |
| Tlogη = 4 | 1156 | 1133 | 1149 | 1192 | 1296 |
| Refractive index nd | 1.514 |  |  |  |  |
| Photoelastic multiplier | 27.1 |  |  |  |  |
| Devitrification test | absent |  |  |  |  |
| Devitrification growth rate | 70 |  |  |  |  |

TABLE 3

|  | Ex. 1 | Ex. 2 | Ex. 3 | Ex. 4 | Ex. 5 | Ex. 6 |
|---|---|---|---|---|---|---|
| CS1 | 203 | 301 | 230 | 207 | 139 | 173 |
| DOC1 | 97 | 100 | 107 | 120 | 100 | 110 |
| CS2 | 904 | 902 | 1057 | 1057 | 1041 | 1074 |
| DOC2 | 9 | 9 | 15 | 11 | 10 | 11 |
| CS3 | 193 | 228 | 232 | 181 | 175 | 180 |
| DOC3 | 155 | 158 | 146 | 131 | 120 | 125 |

TABLE 4

|  | Ex. 7 | Ex. 8 | Ex. 9 | Ex. 10 | Ex. 11 |
|---|---|---|---|---|---|
| CS1 | 200 | 523 | 450 | 372 | 198 |
| DOC1 | 106 | 100 | 138 | 135 | 164 |
| CS2 | 1031 | 962 | 1064 | 992 | 1245 |
| DOC2 | 11 | 10 | 7 | 7 | 11 |
| CS3 | 232 | 371 | 271 | 230 | 169 |
| DOC3 | 124 | 120 | 157 | 167 | 183 |

Tables 1 to 4 show that Examples 3 to 11, in which the values of X ($X=([Li_2O]+[K_2O])/[Al_2O_3]$) had been 1.1 or less, had surface compressive stresses (CS2) as large as 950 MPa or above, as compared with Examples 1 and 2, in which the values of X ($X=([Li_2O]+[K_2O])/[Al_2O_3]$) had been large.

It can also be seen that Examples 4 to 7, in which the total contents of CaO and SrO had been 1.5% by mole or higher, were less apt to suffer devitrification as compared with Example 3, in which the total content of CaO and SrO had been less than 1.5% by mole.

While the present invention has been described in detail and with reference to specific embodiments thereof, it will be apparent to one skilled in the art that various changes and modifications can be made therein without departing from the spirit and scope thereof. This application is based on a Japanese patent application filed on Apr. 4, 2018 (Application No. 2018-072487), the contents thereof being incorporated herein by reference.

REFERENCE SIGNS LIST

1 Platinum vessel for devitrification evaluation
2 Recess
3 Glass particle

The invention claimed is:

1. A glass for chemical strengthening comprising, in terms of mole percentage on an oxide basis:
55-70% of $SiO_2$;
10-25% of $Al_2O_3$;
1-20% of $Li_2O$;

0-8% of CaO;
0.5-8% of SrO; and
0-5% of $ZrO_2$,
0-6% of $Na_2O$;
0.5-10% of $B_2O_3$;
having a total content of CaO and SrO of 1.5-10%,
a total content of $Na_2O$ and $K_2O$ of 3-11%,
a total content of MgO, BaO, and ZnO of 0-5%, and
a value of X represented by the following expression of 0.1-1.1:

$X=([Li_2O]+[K_2O])/[Al_2O_3]$, wherein $[Al_2O_3]$, $[Li_2O]$, and $[K_2O]$ designate contents of the respective components in mole percentage.

2. The glass for chemical strengthening according to claim 1, comprising, in terms of mole percentage on an oxide basis:
12-25% of $Al_2O_3$.

3. The glass for chemical strengthening according to claim 1, comprising, in terms of mole percentage on an oxide basis:
9-20% of $Li_2O$.

4. The glass for chemical strengthening according to claim 1, comprising, in terms of mole percentage on an oxide basis:
1-8% of SrO.

5. The glass for chemical strengthening according to claim 1, having a temperature (T4) at which a viscosity of the glass is $10^4$ dPa·s of 1,050-1,300° C.

6. The glass for chemical strengthening according to claim 1, having a devitrification temperature being not higher than a temperature (T4+120° C.) that is higher by 120° C. than the temperature (T4) at which the viscosity of the glass is $10^4$ dPa·s.

7. The glass for chemical strengthening according to claim 1, having the devitrification temperature being not lower than a temperature (T5.5) at which the viscosity of the glass is $10^{5.5}$ dPa·s.

8. The glass for chemical strengthening according to claim 1, having a temperature (T2) at which the viscosity of the glass is $10^2$ dPa·s of 1,400-1,800° C.

9. The glass for chemical strengthening according to claim 1, having a surface compressive stress of 950 MPa or larger and a depth of a surface compressive-stress layer of 100 µm or larger, after being subjected, as a glass sheet having a thickness of 0.8 mm, to two-stage chemical strengthening including 3-hour immersion in 450° C. sodium nitrate and subsequent 1.5-hour immersion in 450° C. potassium nitrate.

* * * * *